Figure 1:
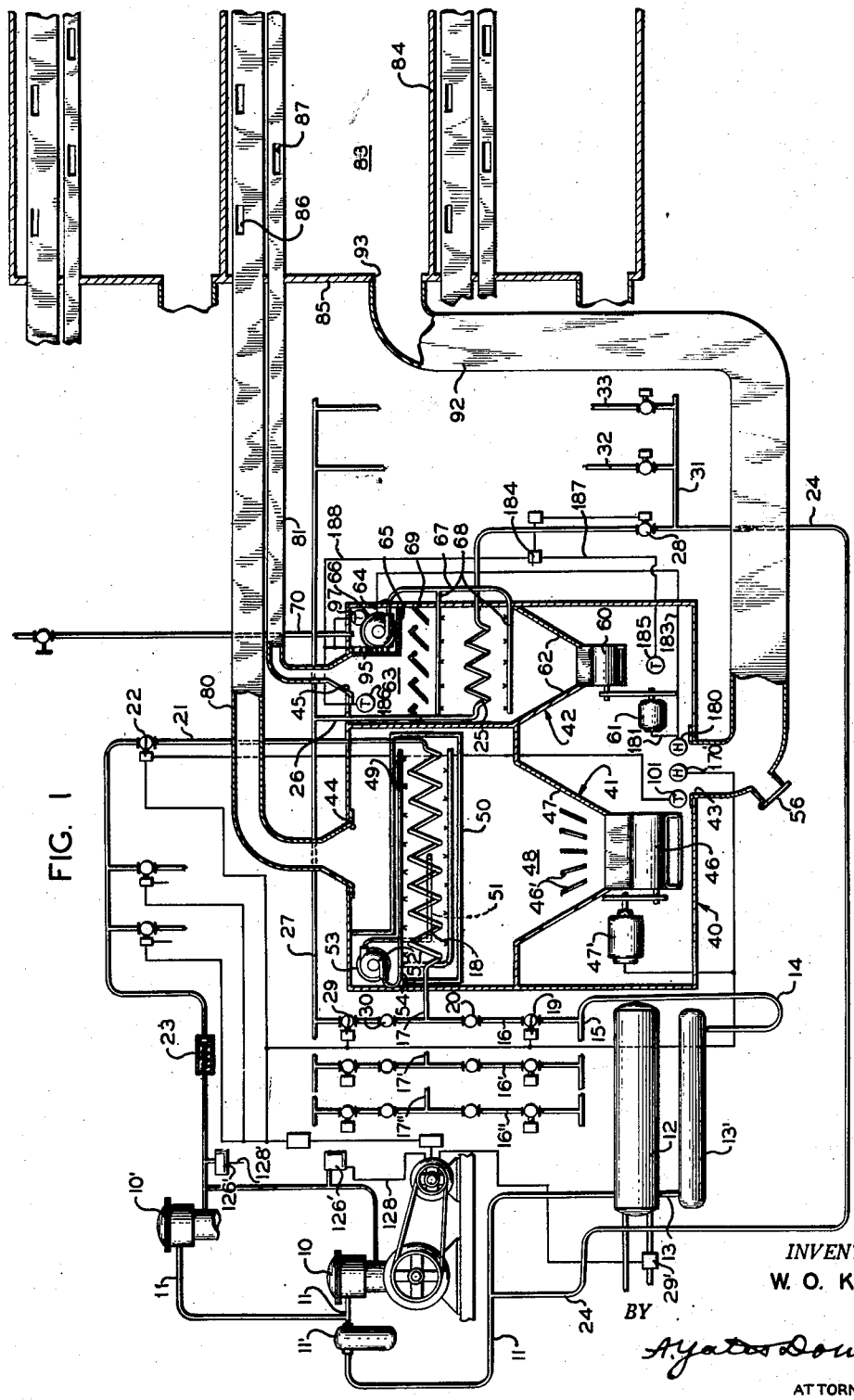

Dec. 2, 1952 W. O. KLINE 2,619,802
AIR CONDITIONING SYSTEM
Filed April 12, 1949 4 Sheets-Sheet 1

INVENTOR.
W. O. KLINE
BY
A. Yates Dowell
ATTORNEY

Dec. 2, 1952 W. O. KLINE 2,619,802
AIR CONDITIONING SYSTEM
Filed April 12, 1949 4 Sheets-Sheet 2

INVENTOR.
W. O. KLINE
BY
A. Yates Dowell
ATTORNEY

Dec. 2, 1952 W. O. KLINE 2,619,802
AIR CONDITIONING SYSTEM
Filed April 12, 1949 4 Sheets-Sheet 3
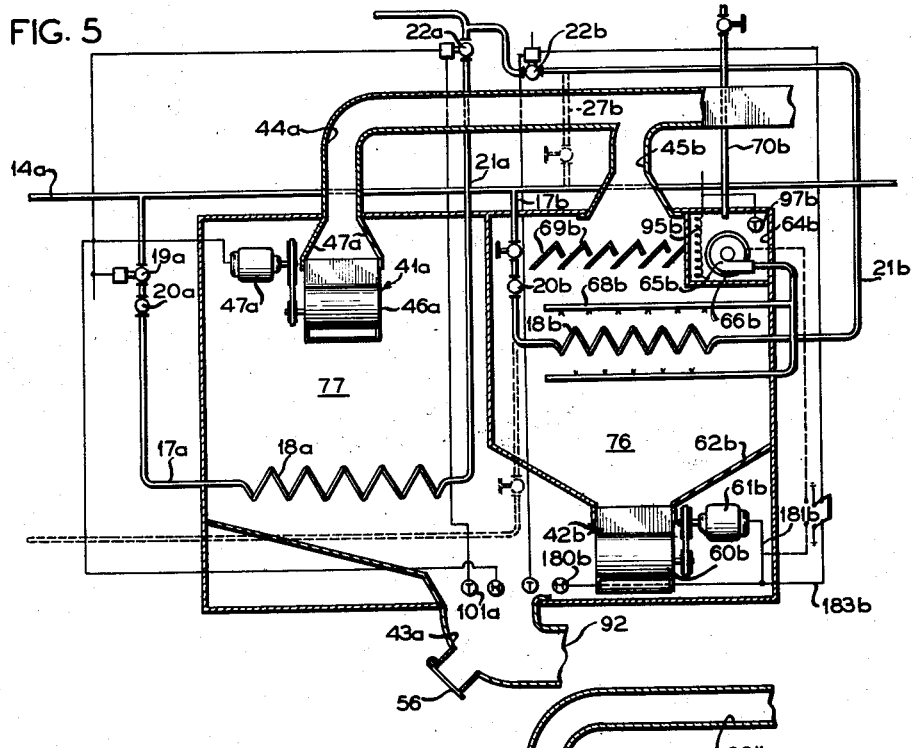
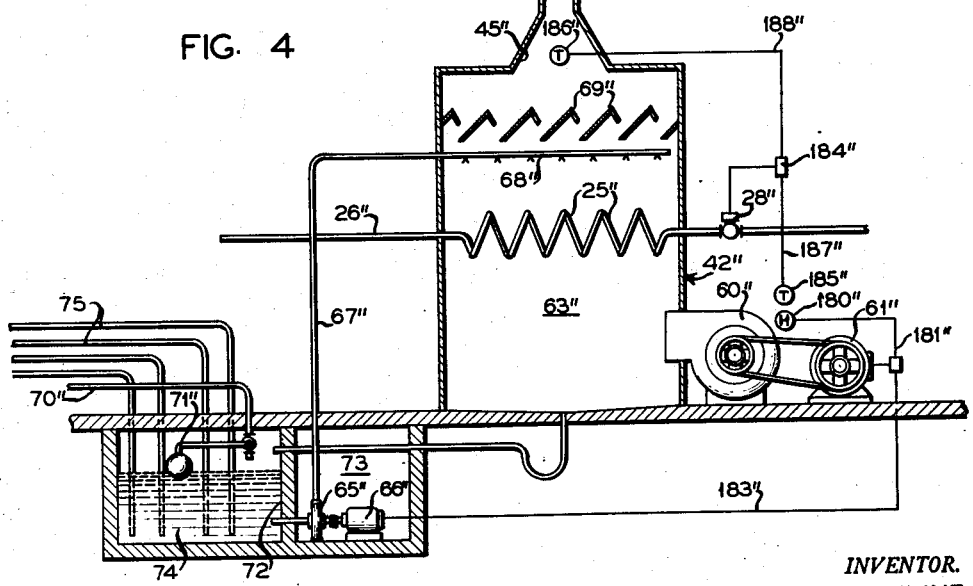
INVENTOR.
W. O. KLINE
BY
A. Yates Dowell
ATTORNEY Dec. 2, 1952 W. O. KLINE 2,619,802
AIR CONDITIONING SYSTEM
Filed April 12, 1949 4 Sheets-Sheet 4

INVENTOR.
W. O. KLINE
BY
A. Yates Dowell
ATTORNEY

Patented Dec. 2, 1952

2,619,802

UNITED STATES PATENT OFFICE 2,619,802

AIR CONDITIONING SYSTEM

William O. Kline, Waynesboro, Pa., assignor to Frick Company, Waynesboro, Pa., a corporation of Pennsylvania Application April 12, 1949, Serial No. 87,057

26 Claims. (Cl. 62—4)

This invention relates to the conditioning of air and more particularly to the provision of a system adapted to maintain a space or the air within an enclosure at specified conditions of temperature and relative humidity and within close limits.

The problem of maintaining proper conditions of temperature and humidity or air conditioning for various purposes has existed for a long time, and in more recent years many systems have been devised and patented on various methods of conditioning air. A large percentage of these systems have been directed to air conditioning for human comfort. Empirical conditions, or a range within which the space should be maintained, have been specified. For example with certain prevailing outside conditions the inside temperature should preferably be on the order of 70° F. and 50 per cent relative humidity.

Apparently considerably less attention has been given and certainly relatively few systems and patents have been directed to the conditioning of a space for industrial purposes such as the storage of commodities where the preferred conditions have been of an order differing substantially in scope from that of the human comfort range.

The present invention and application is directed to the provision of a system for maintaining a space at a temperature and relative humidity best suited for the storage of a commodity or food having a very large water content, such as apples.

It has been found that in order to maintain stored apples in the best condition for the longest time and with minimum loss of weight by dehydration, certain optimum conditions are both desirable and necessary. In order to accomplish these results, the temperature should be low enough to prevent the substantial growth of bacteria and preserve the fruit in its original state as nearly as possible but without impairing the quality and texture by a change of state, such as freezing, and the humidity must be kept relatively high to prevent excessive evaporation of moisture.

Although this invention is primarily directed to the preservation of commodities without freezing, it is obviously applicable to other temperature ranges including those at which a given commodity is normally in the frozen state. It has been found that a dry bulb temperature of about 32° F. and a relative humidity of about 85 per cent, together with low air velocity past the fruit, preserves the apples over a longer period of time and with a minimum loss of weight.

To those skilled in the art of air conditioning it will be understood that the problems encountered in maintaining conditions of this order are vastly different from those found in conditioning for human comfort. For example, the operation at these conditions is performed very close to saturation and therefore the controls and permissible limits of variation must be much finer.

On the other hand, in conditioning for human comfort the operation is further from the saturation line and therefore the controls need not be as sensitive. Furthermore, the range of conditions for human comfort, as recognized by various authorities, is considerably wider or greater than those permissible in the conditioning of certain commodities.

The importance of preserving various commodities for relatively long periods of time will be appreciated on reflection that often a product can best be sold during the off-season when similar products are not on the market in substantial quantity, and that in large storage installations the loss of size or weight of the product, even if only in the neighborhood of about 5 or 10 per cent, results in substantial loss.

An object of the present invention is to provide an air conditioning system including means capable of conditioning air within an enclosure at a relatively high humidity and a relatively low temperature.

A further object of the invention is to provide means whereby a commodity may be stored for a relatively long period of time and its size, weight, composition and appearance substantially maintained.

Another object of the invention is to provide means for conditioning the space in which a product is stored in order that the loss of moisture in the product will be a minimum.

A further object of the invention is to provide a system for conditioning a storage space for commodities in which the temperature, relative humidity, and ventilation are controlled so that the commodities are preserved in substantially their original condition.

A still further object of the invention is to provide a year around air conditioning system for commodities which is adapted to operate efficiently and on a relatively large or small scale and maintain the commodities in substantially their original condition for long periods of time.

Another object of the invention is the provision of a control system for an air conditioning unit which is adapted to maintain close control of the conditions and to operate the various components of the system in the most efficient manner.

Figure 6:
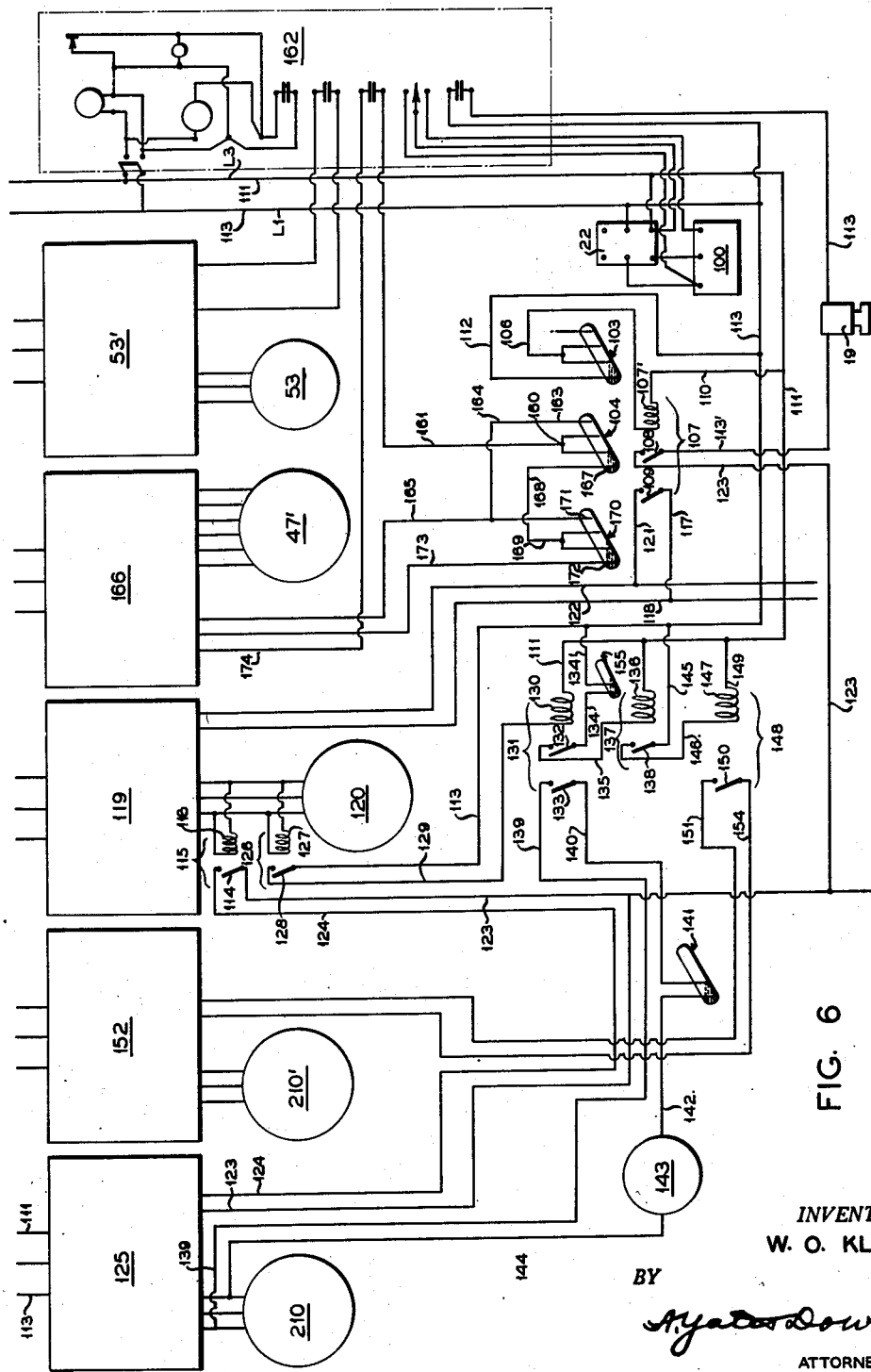

These and other objects of the invention will become aparent from the following description taken in conjunction with the accompanying drawings, wherein:

Fig. 1 is a schematic diagram of a system constructed in accordance with the present invention, the left hand portion being a layout of the refrigeration and air condtioning units and the right hand portion illustrating a vertical section through a building in which ducts from the air conditioning system are positioned;

Fig. 2, a partial schematic layout of a modified system;

Fig. 3, a vertical section through a humidifier of a modified construction from that shown in Figs. 1 and 2;

Fig. 4, a view similar to Fig. 3, of a modified humidifier having its sump below the floor level;

Fig. 5, a fragmentary schematic layout of a modified system; and,

Fig. 6, a diagram of a control system employed with the apparatus of the present invention.

The invention is primarily directed to an air conditioning system, including a refrigeration system, an air conditioning chamber including a cooling unit and a humidifying unit, an air duct system communicating with the space to be conditioned, and controls for the system.

The refrigeration system

The refrigeration system, adapted for cooling the air within the space, comprises compressors 10 and 10' in parallel and having a discharge line 11 in which an oil trap 11' is located, the line 11 leading to a condenser 12 connected by a line 13 to a receiver 13'. From the receiver 13' a liquid supply line 14 leads to a header 15 for supplying refrigerant to a conduit 16 which leads to a receiving pipe 17 of the evaporator coils 18. Positioned in the line 16 are an electric control valve 19 and an expansion valve 20.

From the coils 18 a suction line 21 extends to the compressors. Located in the suction line is a motor actuated modulating control valve 22, and a spring loaded back pressure valve 23. These may be combined into a unit if desired.

A branch line 24 is connected to the compressor discharge line 11 between the compressor and the condenser and leads to a heat coil or heat exchange element 25 located in the humidifying unit. From the heat coil a conduit 26 connects the coil to a liquid supply header 27 which is connected to the conduit 17 leading to the evaporator coil 18. Electric control valves 28 and 29 are located in the hot gas line 24 and the liquid supply line 27, respectively, and an expansion valve 30 is also located in the latter line.

An electrical control valve 29' is shown on the water line going into the condenser 12 which receives water from a pump. If desired the water supply may be from a main, and it's intake to the condenser controlled by a condensing pressure actuating valve.

It will be apparent that the system described is adapted to supply refrigerant to a cooling unit in which the evaporator 18 is positioned, and to a humidifying unit in which the heat exchange element 25 is positioned.

The invention contemplates that one or more cooling and humidifying units may be supplied with refrigerant from the same refrigeration system. For this purpose branch lines 16', 16'', etc., are connected to the supply header 15 and have discharge lines 17' and 17'' leading to their respective evaporators. Similarly a header 31 extends from the hot gas line 24 and is provided with branch lines 32 and 33 leading to their respective heat exchange elements of other humidifying units. The branch lines are connected in parallel so that any combination of one or more in operation is possible.

In operation, the compressors receive refrigerant gas through the suction line 21 and discharge it through the line 11 to the condenser 12 where it is liquefied. Passing from the condenser 12 and the receiver 13' the liquid refrigerant is expanded through the expansion valve 20 and goes into the evaporator coil 18 where it cools the air passing over the coils. The gas from the coils then enters the suction line 21 to the compressor 10 or 10'. A portion of the hot gas from the compressor may be by-passed around the condenser and to the heat coil 25, located in the humidifying unit; the gas, giving up heat to the recirculated water in the humidifier, is thereby liquefied and conducted through the liquid lines 26 and 27 to the expansion valve 30 and the evaporator 18.

The air conditioning chamber

*The cooling unit.*—In order to control the temperature, relative humidity, and velocity of the air circulated through the conditioned space, an air conditioning chamber 40 is provided which includes cooling and humidifying units 41 and 42 in parallel in the chamber. The chamber has a return air opening 43, and discharge openings 44 and 45 for the cooling and humidifying units respectively. Positioned near the inlet 43 is a main fan or blower 46, powered by a motor 47'. The blower 46 has diverging walls 47 and guide vanes 46' on its outlet which direct its discharge to a cooling chamber 48.

Positioned in the cooling chamber 48 adjacent the evaporator 18 of the refrigeration system are pipes 49 which are adapted to spray water, brine, or the like over the coils 18. A tank 50 is positioned under the coils 18 to receive the liquid. From the tank 50 a line 51 is connected to a pump 52 powered by a motor 53. A return line 54 leads from the pump to the spray pipe 49.

A fresh air inlet 56 is provided in the return air line 92 from the space in order that outside air may be mixed with the recirculated air.

The system shown in the drawings is particularly for a water spray defrosting system, it being understood that the invention also contemplates the use of other defrosting media such as brine or the like. Where brine is used by spray may be operated without stopping operation of the main fan or blower and suitable baffles are used between the spray and the exit of the cooling chamber.

*The humidifying unit.*—In parallel with the cooling unit is the humidifying unit 42. The unit includes a fan or blower 60 powered by a motor 61. The inlet of the blower for the layout shown is near the return air opening 43 of the air conditioning chamber and has diverging discharge directing walls 62 directed to the main humidifying chamber 63. Located in the main humidifying chamber is the heat exchange coil 25 in which hot gas from the compressor 10 is adapted to be received and condensed.

The humidifying unit has a water supply tank 64 in which a pump 65 driven by a motor 66 is positioned. The pump is adapted to circulate water from the tank through a conduit 67 to pipes 68 from which the water sprays through the space and over the coil 25. The water which is not taken up by the air passing through the chamber is drained back by the tank 64 and recirculated. A resistance type electric heater 95 having a thermostat 97 is positioned in the tank and adapted to maintain the temperature of the water above freezing in the event that the heat obtained from the coil 25 is insufficient, and during periods when the unit is idle.

Positioned between the humidifier spray and the discharge 45 is an eliminator or baffle 69 for removing entrained droplets. Water is adapted to be supplied through a line 70, a float valve 71 (Fig. 3) controlling the level of the liquid in the tank. The invention contemplates the use of the water tank either above the surface of the ground or below, and a horizontal unit as in Figs. 1 and 2, or vertical, as in Figs. 3 and 4. Although the individual elements of the units of Figs. 3 and 4 are substantially identical with those of Figs. 1 and 2, and with each other, the reference characters of common mechanical elements in Figs. 3 and 4 are designated with a prime (') and double prime (''), respectively, for distinction.

Figs. 3 and 4 illustrate vertical type humidifiers, the former having a sump above the floor or ground level and the latter having a sump below the ground level. The former is particularly adapted for use in installations above the ground floor and where it is not feasible or desirable to alter the construction of the building materially. The walls of the sump are of relatively great thickness in order to insulate the water therein from the below freezing temperatures prevailing outside of the sump.

In the humidifier shown in Fig. 4, the sump is placed beneath the level of the floor or ground and thereby insulated from the freezing temperature of the air. A dividing wall 72 is positioned in the sump to provide a chamber 73 for the pump separate from the chamber 74 for the water. The invention contemplates the provision of a common sump to supply water for all of the elements of the system requiring the same, represented by supply pipes 75 in the sump. For example, the condenser cooling water may be piped to the sump and then to a suitable cooling tower prior to return to the condenser; if a water spray is used to defrost the cooler coils, it may be supplied from the sump, in addition to the supply required for use in the humidifier.

The foregoing discussion has dealt with the use of a pair of compressors in parallel for supplying refrigerant to the cooling coil of a cooling unit and for supplying compressed gas to a heating coil of a humidifier unit beside the cooling unit. The invention also contemplates the interchangeability of cooling and humidifying units. During loading and precooling the demand for refrigeration is great compared to that required for holding the desired temperature in the space after loading and precooling. One very satisfactory solution for meeting the demand during loading has been to employ cooling units in parallel as shown in Fig. 5, and to operate one as a humidifier during holding periods when the demand for cooling is relatively low.

Although either or both of the units may be of the draw-through or push-through type, a preferred arrangement is that shown in which the unit 76 is of the push-through type and is adapted to operate either as a cooler or as a humidifier, apparatus and controls being so provided for it. The unit 77 beside the interchangeable unit may be of the draw-through or push-through type, that disclosed being the former. Although a draw-through humidifier may be employed, the first cost of the system employing a push-through type is lower and the air distribution system may be smaller as less air is required for circulation because it leaves the push-through unit in a saturated condition. Therefore, to meet the varying needs, different combinations of the units may be employed.

The units 76 and 77 shown in Fig. 5 include elements similar to those shown in Figs. 1 and 2. Insofar as the elements are similar, those for the unit 77 are distinguished with a small "a" suffixed to the numeral and those to the unit 76 with a small "b" suffixed to the numeral.

During precooling or other times when the cooling load is unusually heavy liquid refrigerant received through the pipe 14a is conveyed through connections 17a and 17b through the cooling coils 18a and 18b in parallel and out through the connections 21a and 21b through their respective modulating valves 22a and 22b to a common suction line leading to the compressor. After the cooling load has been reduced to the holding condition the line 17b may be closed and the line 24b shown in phantom opened to conduct hot compressed gaseous refrigerant through the coil 18b. The refrigerant may be condensed in the coil and returned through the line 27b shown in phantom to the line 14a to the coil 18a. The spray 68b is employed only during the periods when the unit 76 is used for humidifying rather than cooling. Suitable electrical controls are diagrammatically shown. The unit 76 may be employed with the connections 24b and 27b, the heat necessary for the evaporation of the moisture during humidification being obtained from the fan motor, the water in the tank also picking up heat when required from the coil 95b. Although not shown in the drawing, suitable defrosting means may be provided for coil 18a.

*The duct system and the conditioned space*

The system included in the present invention contemplates the provision of ducts which convey air to and from the conditioned space and through the air conditioning chamber in which the cooling and humidifying units are located. In the preferred form of the invention in which the blower is employed ahead of the cooling coils 18, and therefore pushes the air therethrough, separate ducts are required for the discharge of the cooling and humidifying units. The duct 80 leading from the discharge 44 of the cooling units is of relatively large size compared to the duct 81 leading from the discharge 45 of the humidifying unit. In the push-through system shown in Fig. 1, it is necessary to have separate ducts because of the psychometric conditions of the air discharged from each of these units. Otherwise the mixing of the saturated air from the cooling unit would result in a mixture having a temperature below the dew point thereof which would cause condensation within a common duct.

The ducts 80 and 81 are received in the conditioned space 83 which has floor-ceiling partitions 84 and outside walls 85. Within the conditioned space 83 the duct 80 branches out to provide uniform distribution of air to the space. It is positioned near the ceiling and has discharge openings 86 at spaced intervals along its length.

The humidifier air duct 81 which is received within the space 83 is spaced from and need not be coextensive with the cooling duct 80 as it carries a smaller volume of air. Its openings 87 are spaced or placed in staggered relationship from the openings 86 of the cooling air duct 80 in order that the discharge from the respective ducts is not mixed until mixture with air already within the space has taken place. Inasmuch as the humidifying duct 81 is of substantially smaller cross-section and length than the cooling duct 80, the total expense of providing a separate duct is not substantially greater than that of a single but larger duct.

In Fig. 2, the blower or fan 46' is placed after the cooling coil so that air is drawn through the coil rather than pushed through as in the preferred embodiment shown in Fig. 1. As the air is drawn through the cooling coil its temperature is reduced to that of saturation but after picking up heat in passing through the blower it is not saturated on discharge. The properties of the air discharged by the cooling and humidifying units shown in Fig. 2, are such that they may be mixed without producing condensation. Therefore, both the discharge ducts 88 and 89, provided for the cooling and humidifying units, respectively, feed into a main duct 90 which is received in the conditioned space. The duct 90 has a series of spaced discharge openings within the space 83.

From the space 83 a return duct 92 leads from the discharge opening of the space to the receiving opening 43 of the air conditioning chamber.

The overhead duct system is particularly advantageous for even conditioned air distribution of the type required for an industrial installation and drafts are substantially eliminated. A low velocity, vertical, downward air flow from the ducts is opposed by the vertical, upward heat and moisture flow from the commodity in the space, resulting in a relatively low velocity horizontal air flow through the cross-section of the space, and the elimination of zones through which ventilation is inadequate. Thus an even distribution of air is obtainable eliminating deficiencies resulting from uneven distribution. Among the deficiencies of prior systems was the freezing of material stored near the cooling coil on the shady side of the space when the coils were operated to cool material stored on an opposite wall of the space exposed to the sun.

In order that the system operate as efficiently as possible, the exterior walls of the conditioned space include vapor seals and adequate insulation so that the high humidity within the space will not be dissipated through its walls.

*The control system*

*The cooling unit controls.*—Automatic controls are provided for the cooling unit to maintain the air in the space within close limits of dry bulb temperature and relative humidity, and to provide efficient operation of the system. A schematic hookup is shown in Figs. 1, 2 and 5, the detailed system in Fig. 6.

Referring particularly to Fig. 6, a temperature controller 100 is provided which is responsive to thermostat bulb 101 positioned in the return air stream from the conditioned space near the opening 43 of the air conditioning chamber. This is a conventional thermostat and preferably of the potentiometer type with a 3° differential in cycles. Each cycle may be days or weeks in length depending on the operating conditions. The thermostat is connected to the modulating motor operated valve 22 in the suction line 21 of the compressor 10. The operation of the valve in any position between fully open and fully closed depends on the temperature of the return air as measured by the thermostat 100. For the conditions specified, the room temperature after precooling varies usually between 30.5° F. and 30.75° F.

Attached to the shafts of the modulating valve motor are auxiliary single pole double throw mercury switches 103 and 104. These switches are actuated by cams which are driven by the modulating motor shaft. In the embodiment shown, switch 103 is connected by a lead 106 to a coil 107' of a relay 107 having movable contact arms 108 and 109. From the coil 107', a lead 110 is attached to a power line 111. The other contact of the switch 103 is connected by a lead 112 to a power line 113 which line 113 may be connected through a defroster timer 162 to one terminal of the electric control valve 19.

The movable arm 108 of the relay 107 has one of its contacts attached to a lead 113' which is attached to the other terminal of the electric control valve 19, and the other to a lead 123 which is attached to a movable arm 114 of a relay 115 having a coil 116. The other contact of the arm 114 is connected to a lead 124 which is attached to the starter 125 of the motor 210 of the compressor 10. Closing of the contact arm 114 energizes the starting circuit 125 of the compressor 10. Upon energization of the starter the circuit through the electric control valve 19 is completed from the power line 113 going through the valve 19, the lead 113', the contact arm 108, the lead 23, the contact arm 114, the lead 124 and the starter 125 to the power line 111. It is apparent therefore that the starting circuit of the compressor 10 is in parallel with the electric control valve 19.

Where a brine system is used, rather than a water system, for defrosting the pump may be connected in parallel with the electrically controlled liquid valve 19 and the compressor with which the valve is connected in parallel in order that the operation of all three may be simultaneous.

The movable arm 109 of the relay 107 has one contact connected to a lead 117 which is attached to a conductor 118 connected to the starter 119 of a condenser water pump motor 120. The other contact of the movable arm 109 is attached to a lead 121 which is connected by a lead 122 to the starter 119. Actuation of the relay 107 closes the switches 108 and 109. The closing of the switch 109 connects the leads 118 and 122 of the starter 119 of the water pump 120 and initiates the operation of the pump.

When the starting circuit of the pump 120 is completed, the relay 115 and a second relay 126 having a coil 127 and a movable arm 128 are energized. The relays are of the time delay type, the relay 115 actuating its arm 114 after a delay of two minutes, and the relay 126 actuating its arm 128 after a delay of fifteen minutes. The movable arm 128 has one contact attached to the power line 113 and the other to a lead 129 in series with a coil 130 of a relay 131 having movable arms 132 and 133. The other side of the coil 130 is attached to the power line 111. One side of the arm 132 is connected by a lead 134 to a low pressure cutout switch 155 responsive to the suction pressure of the compressor 10'; a lead 134' from the switch is attached to the power line 113. The other arm is connected by a lead 135 to a coil 136 of a fifteen minute time delay relay 137 having a movable contact arm 138. The other side of the coil 136 is connected to the power line 111.

The movable arm 133 of the relay 131 has a lead 139 connected on one of the power lines going to the compressor motor 210, and another lead 140 going to one side of a low presure switch 141. A lead 142 from the other side of the low pressure switch is attached to one side of a capacity control 143, and a lead 144 from the other side of the capacity control is attached to another of the power lines of the motor 210.

The movable contact 138 of the time delay relay 137 has one lead 145 connected to the power line 113 and the other by a lead 146 to a coil 147 of a relay 148. The other side of the coil 147 is connected by a lead 149 to the power line 111. The relay 148 has a movable arm 150, the contacts of which are attached to leads 151 and 154 to the starting circuit 152 of the compressor motor 210'. When the switch 150 is closed, the starting circuit of the motor 210' is energized.

The other mercury switch 104 which is actuated by the modulating motor has its central pole 160 connected by a lead 161 to the defrosting system program automatic timer 162. One pole 163 of the switch is connected by leads 164 and 165 to a low speed control in the starting circuit 166 of the main fan motor 47'. The other pole 167 of the switch 104 is connected by a lead 168 to the central pole of a single pole double throw mercury switch 170 operated by the humidity control or humidistat 170'.

The humidistat 170' is positioned in the return air stream from the conditioned space in order that it be responsive to the relative humidity of the air returning from the space. In the embodiment which is particularly adapted for the storage of apples, the humidistat is preferably set at a mean of 85 per cent relative humidity and has a range of 2½ to 3 per cent on either side.

As previously pointed out, the central pole 169 of the humidistat switch is connected by the lead 168 to a pole 167 of the single pole double throw switch 104 which is actuated by the modulating motor under control of the thermostat 100. One pole 171 of the switch 170 is connected to the lead 165 which is in series with a slow speed control of the fan motor 47'. The other pole 172 of the switch 170 is connected by a lead 173 to a high speed control in the circuit 166 of the fan motor 47'. A lead 174 from the fan motor control is connected to the program timer 162 and is adapted to complete the circuit from either the low or high speed contacts 166 of the fan motor 47'.

The aforementioned pressure switches 141 and 155 which control the capacity control and motor starting circuits of the compressors 10 and 10' respectively, are set to open their respective circuits at a relatively low pressure and to close them at a relatively high pressure. For example, the pressure switch 141 may be set to open at 16 p. s. i. and to close at 22 p. s. i.; the switch 155 may be set to open at 18 p. s. i. and close at 40 p. s. i. This arrangement of the switches adjusts the compressor capacity of the system to the demand for refrigeration, the control system disclosed being adapted to more than two compressors, obviously.

The pressure responsive switches are connected in the system with timing relays in order to prevent short cycling of any one compressor and to prevent the simultaneous starting of two or more compressors.

At the start of a typical cycle of operation, assuming that the pressure in the suction line to the two compressors is of sufficient magnitude to place the switches 141 and 155 in the "on" position, the compressor 10 associated with the switch 141 will begin operation and the timing relay 137 associated with the compressor 10' will be actuated. If after the expiration of the time for which the timing relay is set, the suction pressure has not been reduced below the setting at which the switch 155 breaks the contact, the compressor 10' begins operation. After the pressure in the suction line is reduced below that at which the switch 155 breaks contact the operation of the compressor 10' ceases and the compressor 10 operates at full capacity until its switch 141 breaks the circuit.

Under other operating conditions, where the switches 141 and 155 are initially in the "on" position, the operation of the compressor 10 may reduce the suction line pressure sufficiently to turn the switch 155 to the "off" position before the time delay relay has started the compressor 10's operation. It is apparent, therefore, that the specific arrangement of the pressure switches and time delay relays provide for economic operation of the compressors and for the prevention of an excessive electrical demand by reason of substantially simultaneous starting of two or more units.

In a typical cycle of operation the sequence of actuation of the various components associated with switch 103 is as follows. The closing of the circuit in the switch 103 energizes the coil 107' of the relay 107 actuating the contact arms 108 and 109. The actuation of the contact arm 109 closes the starting circuit 119 of the condenser water pump motor 120. Operation of the water pump motor 120 actuates the time delay relays 115 and 126 associated with the water pump motor. After a short time delay, for example two minutes, to permit the pump to fill the water circuit, the contact arm 114 of the relay 115 is actuated and closes the starting circuit 125 of the motor of the compressor 10. This also completes the circuit to the electric control valve 19 in the liquid line which is in parallel with the starting circuit 125. After a further time delay, for example, 15 minutes, the contact arm 128 of the relay 126 closes a circuit to the coil 130 of the relay 131. The relay 131 thus has its pair of contact arms 132 and 133 closed, and provided that the switch 141 is in the "on" position, the capacity control 143 of the motor compressor 10 is energized, as is the coil 136 of the time delay relay 137, provided that the switch 155 is in the "on" position. After the time delay for which the relay 137 is set, as for example 15 minutes, has expired, the contact arm 133 of the relay is closed, thus closing the circuit 147 of the relay 148. This closes the contact arm 150 of the relay which closes the starting circuit 152 of the motor 153 for driving the compressor 10'.

In the operation of the fan speed control system, when the dry bulb temperature of the space rises above that at which the thermostat 100 is set, the modulating suction control valve 22 opens in accordance with the demand for cooling, and the auxiliary switches 103 and 104 are actuated. If the temperature rise or the demand for cooling is slight, as for example ⅕ of 1°, the control valve 22 is opened only slightly so that a small amount of cooling at high ammonia temperature within the cooling coil is applied to the air.

High ammonia temperature results in the removal of less moisture from the air than with low temperature and thus helps maintain the high humidity. If the increase of temperature above the thermostat setting is substantial, however, the valve 22 will open further so that more cooling takes place. If the relative humidity should exceed the setting of the humidistat 170' the switch 118 will close a circuit to the low speed control of the blower through the pole 119. If there is a demand for cooling and humidity, however, the humidistat switch will close the connection to the high speed control of the blower through the pole 121. If the temperature of the air contacting the thermostat drops below its mean setting about a degree, in accordance with a preferred setting, the switch 104 associated with the modulating motor closes the circuit through the pole 163 to the low speed control of the blower, regardless of the condition of the relative humidity. Before this change of speed takes place the modulating valve 22 is practically closed so that the ammonia temperature in the coil has been raised to almost its highest point and therefore the speed change can be made in order to save about 75 per cent of the blower power.

Regardless of the temperature prevailing the humidistat may change the speed of the blower from high to low if the relative humidity exceeds the instrument setting. Of course, after the thermostat has changed the fan speed to low the humidistat has no further effect on the speed, but under these conditions, as a practical result, an inside relative humidity that is considered too high is a remote possibility. This may be corrected by proper adjustment of the controls.

It is apparent, therefore, that during cooling the ammonia temperature rises as the space air temperature decreases, and that the refrigerant and space approach the same temperature. During cooling the suction control valve gradually closes and the fan speed is reduced from high to low in accordance with the control settings. When the thermostat is satisfied as to cooling the compressor stops and the electric control valve on the liquid line closes.

During winter, the outside temperature may decrease the inside temperature below the instrument range setting. When this occurs the relay is set to close the circuit to the high speed circuit of the main blower in order that substantial heat is added to the space due to its operation. It is understood that in winter operation a need for humidification exists at nearly all times.

In practice, the main blower preferably has a relatively large capacity in order that a smaller temperature differential of the air entering and leaving the space may be employed. In this way dehydration of the air is reduced as the coils may have a relatively high temperature, and more even temperatures in the space are possible. Because of the positioning of the ducts in the space, a slow air movement past the stored product is achievable even with relatively large air movement.

The defroster timer 162 is of conventional construction and provides timing connections which may be set to defrost the unit on a given cycle. The starting circuit 53' of the defrosting water pump motor 53 is connected by leads to the timer and is adapted to operate through a portion of each cycle. As the defrosting cycle is of conventional construction a detailed discussion thereof is believed unnecessary.

*The humidifier control.*—Independent controls are provided for the humidifying unit. These include a humidistat 180 which is positioned in the return air stream from the conditioned space. It is connected by a line 181 to the motor starter 182 of the blower motor 61. The motor is connected in parallel by line 183 to the water pump motor 66 positioned in the tank so that the pump will operate with the blower.

A differential type thermostat 184 has bulbs 185 and 186 positioned in the return air stream from the conditioned space and the discharge from the humidifying unit, respectively. This is set to operate on about ½° F. differential between the bulbs and by means of a suitable connections 187 and 188, operates a switch in the thermostat 184 which controls the electric control valve 28 in the hot gas line leading to the heat coil 25 in the unit.

It will be apparent that in operation, the humidistat 180 in response to a demand for humidification will cause the blower 60 and water pump 65 to operate. The differential thermostat is set so that the air leaving the unit is at substantially the same dry bulb temperature as that entering. Therefore, the humidifying unit may be set to follow the dry bulb temperature of the air in the conditioned space whether the space is being precooled, loaded, or held at a steady temperature. Thus the only effect of the humidifying unit on the conditioned air is to add humidity as required.

By the use of separate blowers for the humidifier and cooling unit, independent operation of the units may be had, resulting in more efficient overall operation. For example, when cooling is not required the main blower may be stopped and the small humidifier blower operated without recirculating water to maintain a small amount of circulation so that an average mixture flows past the controls.

It is apparent that the present invention contemplates the provision of a system for maintaining the air within a commodity storage space at a low temperature and high relative humidity, and for providing low velocity, evenly distributed air flow through the space. The system includes automatic controls which maintain optimum conditions in the space and at maximum operating efficiency.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. An air conditioning system comprising a refrigeration system including compressing, condensing, and evaporating means, a cooler for providing heat exchange between the air and said evaporating means, a humidifier for the air, a bypass from the compressing means to the evaporating means and including an element adapted to dissipate heat to the humidifier, and differential temperature responsive means controlling the transfer of heat to said element, said means being responsive to the difference in temperature of the air before and after passing through the humidifier, whereby substantially all the heat added to the air passing through the humidifier is latent.

2. An air conditioning system comprising a refrigeration system including heat absorption and heat dissipation means, an air conditioning unit including a cooler and a humidifier having an inlet for return air and an outlet for discharge air, the heat absorption means being positioned in the cooler and adapted to absorb heat from the air passing therethrough, a main blower provided for the cooler and a second blower provided for the humidifier, the inlets of the blowers being positioned adjacent the return air inlet of the air conditioning unit and adapted to produce the flow of air through the cooler and humidifier, respectively, a space to be conditioned, individual air ducts connecting the discharge of the cooler and humidifier to the space, and a return air duct connecting the space to the air conditioning unit.

3. An air conditioning system comprising a refrigeration system including heat dissipating and heat absorbing elements, an air conditioning unit comprising cooling and humidifying units, a heat absorbing element being in heat exchange relation with the cooling unit, and a heat dissipating element being in heat exchange relation with the humidifying unit, a space to be conditioned, discharge and return air ducts connecting the space and the air conditioning unit, means for circulating air through the space, ducts, and air conditioning unit, differential temperature means responsive to the dry bulb temperature of the air entering and leaving the humidifying unit and adapted to control the operation of the heat dissipating element in the humidifying unit, whereby the humidifying unit may add moisture to the air without substantial effect on its dry bulb temperature.

4. The structure recited in claim 3, the circulating means including a blower in the humidifying unit for forcing air through said unit, whereby heat rejected from the refrigeration system and that given up by the blower motor are received by the humidifying unit.

5. An air conditioning system comprising a refrigeration system including connected compressing, condensing and evaporating means, an air conditioning chamber having the evaporating means positioned therein and discharge and return air openings, ducts connecting the openings to a space for air conditioning, a blower in the chamber having its inlet near the return air opening and adapted to force air in heat exchange relation with the evaporating means and through the discharge opening, a modulating valve in the compressor suction line, means responsive to the temperature of the air entering the chamber and adapted to gradually close the modulating valve as the temperature of the air is reduced whereby the temperature of the evaporating means is raised as the return air temperature is lowered in order to reduce condensation on the evaporating means and whereby heat is added to the air by the blower prior to its passing in heat exchange relation with the evaporating means so that its relative humidity after passing the evaporating means is unchanged by the blower.

6. The structure recited in claim 5 and a humidifier in the air conditioning chamber having its air circuit in parallel with that through the blower and evaporating means, the humidifier comprising means for adding moisture to the air and a second blower having its inlet near the return air connection of the chamber and adapted to force air through the moisture adding means.

7. In an air conditioning system including a cooling unit and a humidifying unit in parallel and provided with a common inlet and individual discharge openings, means to force air received from the inlet through the units and to discharge the same through their individual discharge openings, the air passing through their individual discharge openings being substantially saturated, individual ducts extending from their discharge openings to a space to be conditioned, branch ducts extending from the individual ducts and supported near the ceiling of the space, the branch ducts being provided with spaced outlets, the outlets of the cooling ducts being staggered with respect to those of the humidifying ducts, and a return air duct connecting the space to the common inlet.

8. In an air conditioning system including compressing, condensing and evaporating means and connection therebetween including a suction line from the evaporating means to the compressing means, a heat exchange chamber in which the evaporating means is positioned, and a multispeed blower for producing air flow through the heat exchange chamber, a control system comprising a modulating valve in the suction line, and means responsive to the temperature and humidity of the air entering the heat exchange chamber and adapted to control the operation of the modulating valve, and multi-speed blower, whereby the modulating valve is gradually closed as the temperature of the air decreases in order to increase the temperature of the evaporating means, and the speed of the blower decreases as the demand for cooling and humidifying is decreased.

9. The structure recited in claim 8, and dependent connections between the temperature and humidity responsive means and controlling the speed of the blower whereby the blower is operated at a relatively high speed upon a substantial demand for both cooling and humidifying, and is operated at a relatively low speed when either the demand for cooling or humidifying is substantially met.

10. The structure recited in claim 8, the air conditioning unit including a humidifier in parallel with the heat exchange chamber and provided with a blower, means for circulating water within the humidifier in contact with air passing therethrough, and means for heating the water including a connection from the compressing means to the humidifier, the humidifier being provided with independently operated control means responsive to the humidity of the air and adapted to operate the humidifier blower and water circulator upon a demand for humidification, a valve in the connection between the compressing means and the humidifier, and means responsive to a temperature differential between the air entering and leaving the humidifier, said means controlling the operation of the valve, whereby upon a demand for humidification air is circulated through the humidifier and in contact with the water, the differential temperature responsive means maintaining the heat of the water such that the temperature of the air entering and leaving the humidifier remains substantially constant in order that the humidifier may add moisture to the air in the system as required but have substantially no effect on its temperature.

11. An air conditioning system comprising a refrigeration system including connected compressing, condensing and evaporating means, an air conditioning chamber comprising cooling and humidifying means in parallel, a conditioned space, ducts connecting the discharge of the cooling and humidifying units to the space, a return air duct connecting the space to the air conditioning chamber, a modulating valve in the compressor suction line, a main multi-speed blower for the cooling chamber and a second blower for the humidifier, means responsive to the temperature and humidity in the space and connected to the modulating valve and the multi-speed blower, whereby the temperature of the evaporator coil and the amount of air circulated therethrough may be varied in response to temperature and humidity conditions in the space.

12. In an air conditioning system a refrigeration system including heat absorbing and heat dissipating elements, a cooler adapted to provide heat exchange between a heat absorbing element and the air, and a humidifier adapted to provide heat exchange between a heat dissipating element and the air, means for controlling the amount of heat supplied to the humidifier by the heat dissipating element, said means including a valve whose operation is controlled by differential temperature responsive means located in the air stream before and after its passage through the humidifier whereby substantially all the heat added to the air by the humidifier is latent.

13. An air conditioning system comprising a plurality of refrigeration systems each including compressing, condensing and evaporating means, a common suction means from the evaporating to the compressing means, a cooler for each of the refrigeration systems adapted to provide heat exchange between the evaporator and the air to be conditioned, and means for controlling the operation of each of the compressors, said means comprising pressure responsive elements located in the suction lines of the various compressors and time delay means in combination with the pressure responsive elements whereby operation of the various compressors is dependent on the demand for cooling in the individual coolers and whereby a substantial time lag is provided between the shutting off and the operation of a compressor.

14. The structure recited in claim 13, multiple compressors being provided for one or more of the refrigeration systems, the pressure responsive means provided for each of the compressors being arranged to operate said compressors in sequence, whereby the compressors will be actuated in sequence in accordance with a demand for refrigeration and whereby a substantial time lag will occur between the starting of operation by the sequential compressors.

15. The method of conditioning air for circulation into a space in which the relative humidity and temperature are maintained at near saturation and close to the freezing point of water respectively, which comprises passing air through a humidifier and a cooler, heating the humidifier and controlling the heating so that the dry bulb temperature of the air entering and leaving the humidifier is substantially the same, passing air through the cooler, and varying the cooling effect of the cooler on the air passing therethrough in accordance with the demand for cooling, whereby the dry bulb temperature of the air passing through the humidifier varies in accordance with the temperature of the air in the conditioned space.

16. The method recited in claim 15, and varying the rate of flow of the air through the cooler in accordance with the demand for cooling and humidification.

17. Apparatus for conditioning air for circulation into a space in which the relative humidity and temperature are maintained at near saturation and close to the freezing point of water, respectively, comprising first and second cooling units each being provided with cooling means and blower means for causing air to flow through the units, the second cooling unit being provided in addition with a humidifying means and control means for selectively operating the cooling or the humidifying means, whereby the units may cool air during relatively large loads and whereby the second unit may humidify air during relatively smaller loads.

19. The structure recited in the preceding claim, the first unit being provided with a blower positioned between the cooling coils and the outlet of the unit and the second unit being provided with a blower positioned between the inlet and cooling and humidifying means.

19. An air conditioning system comprising a refrigeration system including compressing, condensing and evaporating means for a refrigerant, one or more air conditioning units through which air for circulation into one or more spaces is passed, a cooler and a humidifier in one or more air conditioning units, the cooler having an evaporating means in heat exchange relation therewith, a bypass from the compressing means to the evaporating means and including an element in heat exchange relation with the humidifier, means for circulating air from the air conditioning units to one or more spaces, and means responsive to the difference in dry bulb temperature of the air entering and leaving the humidifier for controlling flow through the bypass to the element in heat exchange relation with the humidifier.

20. The structure recited in claim 19 and temperatures responsive means in the air stream from the space to the cooler for controlling the cooling effect of the cooler.

21. An air conditioning system for the maintenance of a space at high relative humidity and a dry bulb temperature near the freezing point of water, comprising a refrigeration system including heat absorption and heat dissipation means, an air conditioning chamber including cooling and humidifying units, an air return and discharge means connecting the air conditioning chamber with the space, a heat absorption means being in heat exchange relation with the cooling unit and a heat dissipation means being in heat exchange relation with the humidifying unit, and means responsive to the difference in dry bulb temperature of the air entering and leaving the humidifying unit for controlling operation of the heat dissipation means.

22. An air conditioning system for the maintenance of a space at the desired humidity and temperature conditions, comprising a refrigeration system including heat absorption and heat dissipation means, an air conditioning chamber including cooling and humidifying units in parallel, air return and discharge means connecting the air conditioning chamber with the space, individual means for circulating air through the cooling and humidifying units, and individual means responsive to one or more psychometric conditions within the space for controlling the operation of the individual circulating means.

23. The structure recited in claim 22, heat dissipation means in heat exchange relation with the humidifying unit, and means responsive to the difference in dry bulb temperature of the air entering and leaving the humidifying unit for controlling said heat dissipation means.

24. In an air conditioning system the method of maintaining a space at a relative humidity near saturation and a dry bulb temperature near the freezing point of water, comprising passing air from the space for return thereto through cooling and humidifying units in parallel, lowering the dry bulb temperature of the air passing through the cooling unit only slightly upon a correspondingly slight rise in the dry bulb temperature of the air in order to decrease the dehumidification of the air in passing through the cooling unit, and controlling the heat supplied to the humidifying unit so that substantially no sensible heat is added to the air in passing through the humidifying unit.

25. The method recited in claim 24 and controlling the circulation of air through the cooling unit by temperature responsive means such that the circulation is decreased when the need for cooling is substantially met.

26. The method of conditioning air for recirculation into a space at which the relative humidity and temperature are maintained at near saturation and close to the freezing point of water, respectively, comprising dividing the air into parallel streams, moving one stream and raising its humidity while maintaining its temperature before and after such conditioning substantially constant, and pushing the other stream of air to produce circulation in parallel with the first stream of air and lowering its temperature after such pushing to cause it to be substantially saturated.

WILLIAM O. KLINE.

REFERENCES CITED

The following references are of record in the file of this patent:

UNITED STATES PATENTS

| Number | Name | Date |
|---|---|---|
| 1,465,028 | Stacey | Aug. 14, 1923 |
| 1,662,806 | Hilger | Mar. 13, 1928 |
| 1,882,030 | Pennington | Oct. 11, 1932 |
| 2,059,874 | Jones | Nov. 3, 1936 |
| 2,093,834 | Gaugler | Sept. 21, 1937 |
| 2,135,285 | Gibson | Nov. 1, 1938 |
| 2,168,157 | Crago | Aug. 1, 1939 |
| 2,188,526 | Burden | Jan. 30, 1940 |
| 2,192,348 | James | Mar. 5, 1940 |
| 2,268,769 | Newton | Jan. 6, 1942 |
| 2,286,538 | Guler | June 16, 1942 |
| 2,296,530 | McGrath | Sept. 22, 1942 |
| 2,376,859 | Benn | May 29, 1945 |
| 2,419,119 | Christensen | Apr. 15, 1947 |